A. T. TIMOSCI.
KETTLE.
APPLICATION FILED AUG. 26, 1919.

1,336,869.

Patented Apr. 13, 1920.

WITNESSES

A. T. Timosci, INVENTOR

ATTORNEYS

UNITED STATES PATENT OFFICE.

ANTONIO T. TIMOSCI, OF SAN JOSE, CALIFORNIA.

KETTLE.

1,336,869.   Specification of Letters Patent.   Patented Apr. 13, 1920.

Application filed August 26, 1919. Serial No. 319,881.

*To all whom it may concern:*

Be it known that I, ANTONIO T. TIMOSCI, a citizen of the United States, and a resident of San Jose, in the county of Santa Clara and State of California, have invented certain new and useful Improvements in Kettles, of which the following is a specification.

My invention is an improvement in kettles, and has for its object to provide a kettle adapted for heating water for any purpose, with fuel of any character, wherein the kettle is so arranged that the water will be quickly and thoroughly heated with a minimum amount of fuel.

Figure 1:
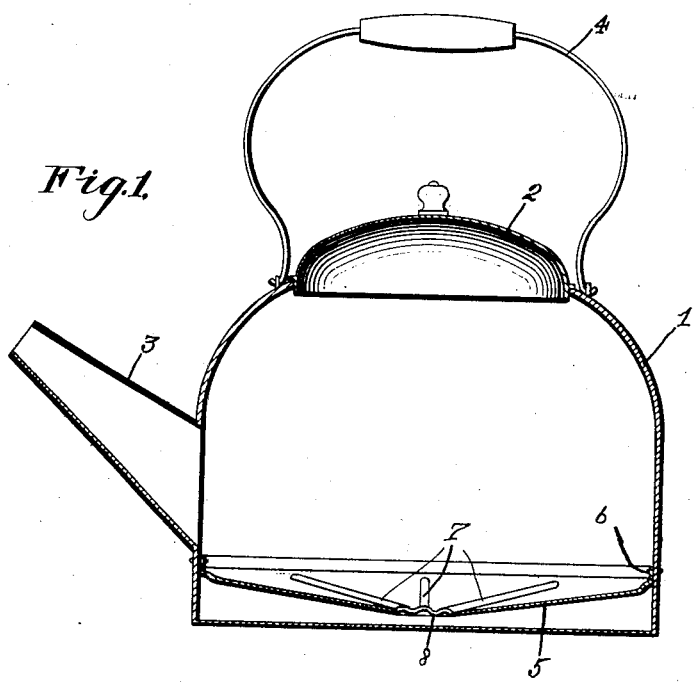
Figure 1 is a vertical section of the improved kettle.
Figure 2:
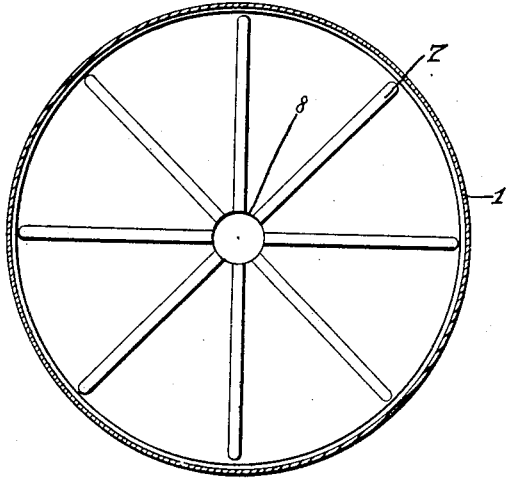
Fig. 2 is a horizontal section.

In the present embodiment of the invention the kettle body 1 is of usual construction, having the cover 2, the spout 3 and the bail 4, and there is arranged within the kettle body and transversely thereof, near the bottom and below the spout, a partition 5. This partition, as shown, is frusto-conical in form, having its apex downward, and at the edge of the base there is a flange 6 which fits against the inner wall of the kettle body and is riveted thereto, as shown.

The partition is provided on its under face with a series of radial grooves, which form radial ribs 7 on the upper face, and at the apex the partition has an opening 8, which places the space below the partition into communication with that above the partition.

In use, the kettle is filled with water in the usual manner and placed upon the stove or gas flame. The water below the partition heats first and moves inward to the opening 8 and passes up at the center of the kettle to the surface of the water therein. The cool water drops down at the sides and flows inwardly along the top of the partition, eventually passing down through the opening.

The purpose of tapering the partition 5 is to insure that the water will flow below the partition when the kettle is filled.

I claim:

A kettle having arranged transversely thereof near the bottom a false bottom or partition, said false bottom having a central opening and inclining downwardly from its outer edge toward the opening and having radial ribs on its upper face forming passages between them leading from the edge to the opening, said false bottom being permanently attached within the kettle.

ANTONIO T. TIMOSCI.